(12) United States Patent
Cowelchuk et al.

(10) Patent No.: US 6,991,841 B2
(45) Date of Patent: Jan. 31, 2006

(54) FOAM IN PLACE COMPOSITE ONE-PIECE HARD/SOFT PANEL

(75) Inventors: Glenn A. Cowelchuk, Chesterfield, MI (US); Richard Morabito, Grosse Ile, MI (US); Joseph T. Donatti, Howell, MI (US); Todd L. Depue, Brighton, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/430,642

(22) Filed: May 6, 2003

(65) Prior Publication Data

US 2004/0224131 A1  Nov. 11, 2004

(51) Int. Cl.
*B32B 5/00* (2006.01)
*D60J 5/00* (2006.01)

(52) U.S. Cl. .......................... 428/71; 428/76; 428/172; 428/192; 296/146.7

(58) Field of Classification Search .................. 428/71, 428/76, 158, 167, 172, 192, 304.4; 296/146.7
See application file for complete search history.

(56) References Cited

U.S. PATENT DOCUMENTS

| | | | | |
|---|---|---|---|---|
| 4,752,517 A | * | 6/1988 | Beitel | 428/122 |
| 4,878,827 A | * | 11/1989 | Muller | 425/434 |
| 5,709,828 A | | 1/1998 | Bemis et al. | |
| 5,895,613 A | | 4/1999 | Nakai et al. | |
| 5,922,431 A | * | 7/1999 | Funato et al. | 428/71 |
| 6,375,878 B1 | | 4/2002 | Gray et al. | |

FOREIGN PATENT DOCUMENTS

EP  0 768 160 A1  4/1997

\* cited by examiner

*Primary Examiner*—Donald J. Loney
(74) *Attorney, Agent, or Firm*—Brooks Kushman P.C.

(57) ABSTRACT

In at least one embodiment, the present invention takes the form of a panel comprising a substrate, a cover layer, and foam disposed between at least a portion of the substrate and the cover layer. At least one of the cover layer or the substrate being is provided with an integrally formed member for sealing the cover layer to the substrate. The present invention also relates to a method for forming the panel.

20 Claims, 3 Drawing Sheets

FOAM IN PLACE COMPOSITE ONE-PIECE HARD/SOFT PANEL

BACKGROUND OF THE INVENTION

1. Field of the Invention

The invention relates to motor vehicle interior parts and method of making the same.

2. Background Art

Motor vehicle interiors have many interior components made of panels. Examples of these types of interior components include, but are not necessarily limited to, interior door panels, instrument panel, consoles, other interior trim parts and seats.

The panels employed in these components typically comprise a relatively hard, rigid substrate, a cover skin or layer, and a soft padding disposed between at least part of the substrate and the skin. The soft padding is typically foam. When foam is used, the panel is made by placing the skin/cover layer in the mold in a spaced apart arrangement, and then introducing foam into the mold. The foam, upon curing, secures the cover skin to the substrate.

A relatively common construction of these panels is to have the substrate have portions that are adjacent the face portion of the cover skin. This reduces the amount of cover skin that is required to be used. Often times the portion of the substrate that is adjacent the face portion of the cover skin is provided with a higher quality surface finish ("A" surface) than the other surfaces of the substrate, since this portion will be exposed to the vehicle compartment interior. During typical forming processes, foam tends to seep between the cover skin and the substrate and, in these types of panels can cause unsightly blemishes at the interface of the cover skin and substrate. A common technique for covering up these blemishes is to place a separate cover or trim piece over the interface, adding cost to the component. It would be desirable to have a clean interface between the substrate and the cover layer/skin, thereby creating an "A" surface, i.e., the aesthetically pleasing surface visible to a vehicle occupant, without using a separate cover. By a clean interface, it is meant that an interface does not have any foam seepage.

Accordingly, it would be desirable to provide a panel and a method for making the panel that does not have noticeable foam seepage at the interface of the cover layer and the substrate.

SUMMARY OF THE INVENTION

In at least one embodiment, the present invention takes the form of a panel comprising a substrate, a cover layer and foam disposed between at least a portion of the substrate and the cover layer. At least one of the cover layer or the substrate is provided with an integrally formed member for sealing the cover layer against the substrate.

In at least another invention, the present invention takes the form of a process for making the panel comprising a substrate, a cover layer and foam disposed between at least a portion of the substrate and the cover layer. The process comprises providing a substrate and a cover layer having at least portions spaced apart to form a cavity. The process further comprises introducing foaming material into the cavity. Allowing the foaming material to cure to form foam, to secure the cover layer and the substrate to the foam. At least one of the cover layer or the substrate is provided with an integrally formed member for sealing the cover layer to the substrate during the curing step.

BRIEF DESCRIPTION OF THE DRAWINGS

The invention will now be described in greater detail in the following way of example only and with reference to the attached drawings, in which.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
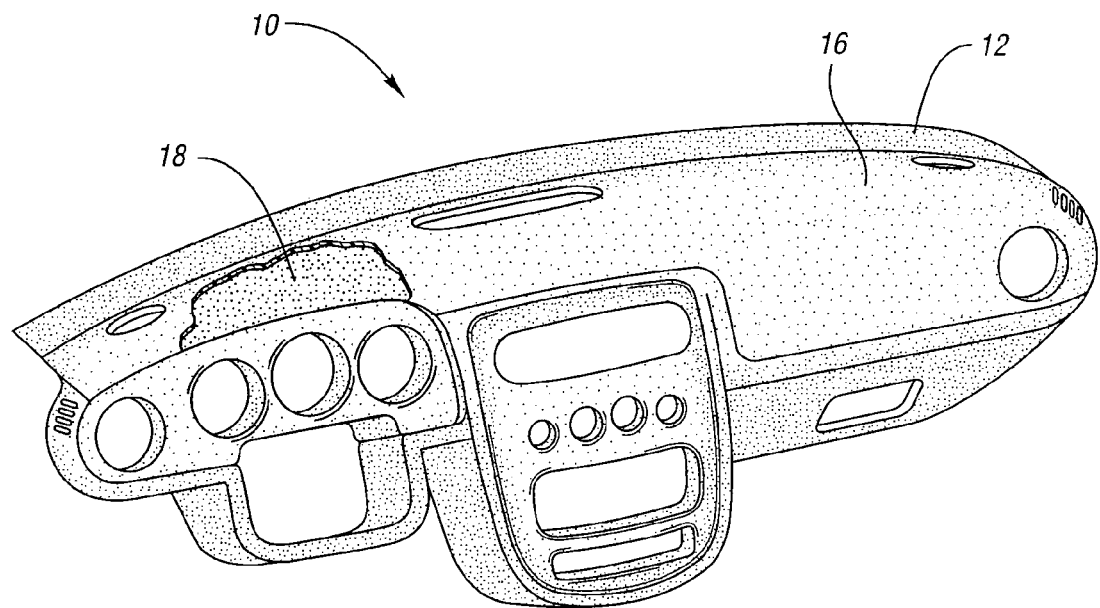
FIG. 1 is a perspective view of a motor vehicle interior component comprising a substrate, foam, and a cover layer manufactured in accordance with the present invention, with a portion of the cover layer being removed for illustration purposes.

FIG. 1 illustrates a motor vehicle interior part, such as an instrument panel 10, made in accordance with the present invention. The panel 10 comprises a rigid substrate 12 and a cover layer 16 disposed over at least a portion of the substrate. The panel 10 has foam 18 that is disposed between at least a portion of the substrate 12 and portions of the cover layer 16. An interface 14 is formed between the substrate 12 and cover layer 16 creating a two-tone effect.

The substrate 12, the cover layer 16 and the foam 18 can be made of any suitable material known to those of ordinary skill in the art. Suitable examples of materials for making the substrate include, but are not necessarily limited to, PP, PE, ABS, TPE, PC, PC/ABS, SMA and TPO. The substrate 12 can be made by any suitable process such as injection molding or compression molding.

The cover layer 16 can be made by any suitable material and by any suitable process known to those of ordinary skill in the art. Suitable examples of materials that can be used to form the cover layer include, but are not necessarily limited to, TPO, PVC, urethane and TPE. The cover layer 16 could be formed by spraying, injection molding, casting, vacuum forming, or other known methods to those of ordinary skill in the art. The foam is any suitable foam made from a foamable material, such as polyurethane, that is known to those of ordinary skill in the art.

Figure 2:
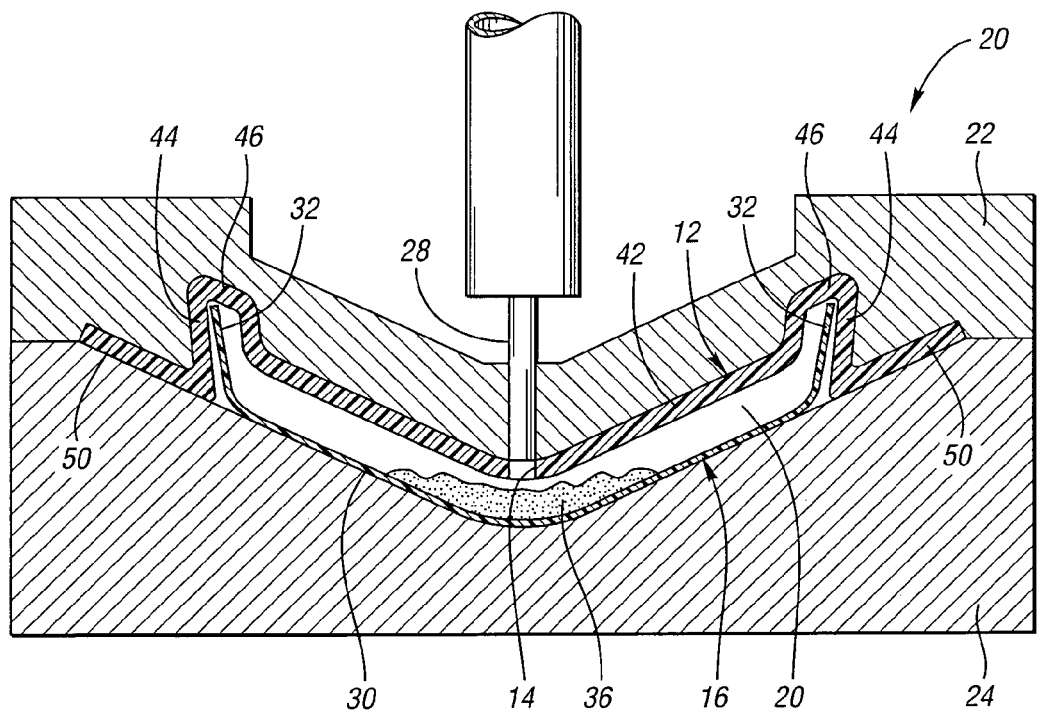
FIG. 2 is a schematic cross sectional view illustrating a manufacturing step of the present invention.

The panel 10 is formed by a foam-in-place process. Any suitable foam-in-place process can be used. One example is shown in FIG. 2, where a molding tool 20 is illustrated.

The molding tool 20 includes an upper mold half 22 and a lower mold half 24. At least one of the mold halves 22 and 24 is capable of axial movement relative to the other mold half. This allows the insertion of the substrate 12 and the cover layer 16 into the molding tool 24. In a typical process, the cover layer 16 is placed upon the lower mold half 24 while the substrate 12 is placed within the molding tool 20 spaced apart from the cover layer 16. While the mold halves 22 and 24 are spaced apart prior to molding, the substrate 12 and cover layer 16 are typically held into place on their respective mold halves 22 and 24 by clips, hooks, or vacuum techniques which are known to those of ordinary skill in the art, or by other suitable means known to those of ordinary skill in the art. After the substrate layer 16 is in place, the mold halves 22 and 24 are closed relative to each other. As can be shown in FIG. 2, the substrate 12 has a substrate facing portion 50 that abuts and extends between at least a portion of each of the mold halves 22 and 24.

The molding tool 20 is configured to allow a foam dispenser 28 to dispense foaming material 36 into cavity 26. Cavity 26 is the area disposed between substrate 12 and cover layer 16. In certain embodiments, such as the exemplary embodiment shown in FIG. 2, the substrate 12 may be provided with an opening 14 to allow the introduction of the foaming material 36 into cavity 26 when the mold halves 22 and 24 are adjacent and abutting each other, i.e., when the molding tool 20 is closed.

Figure 3:
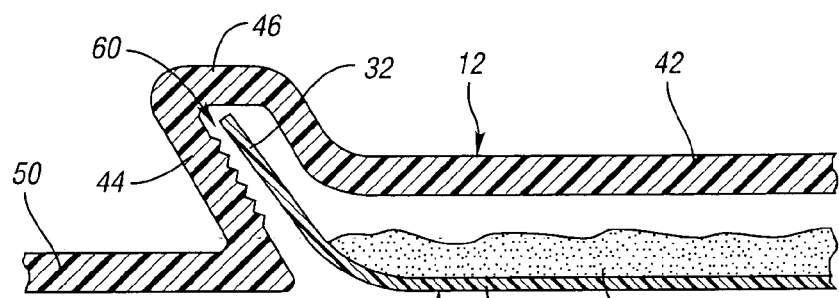
FIG. 3 is a schematic cross sectional view of a portion of the panel of one of the embodiments of the present invention during manufacture.
Figure 4:
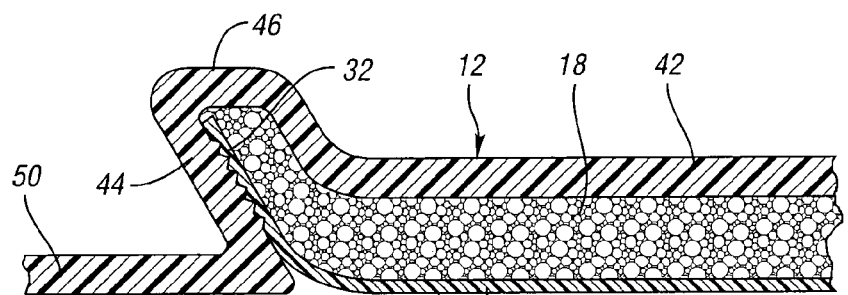
FIG. 4 is a view similar to FIG. 3 illustrating the manufactured panel of FIG. 3.

Substrate 12 is provided with a substrate main body portion 42, that has at least a substantial portion extending generally along one plane. The substrate 12 has a substrate perimeter portion 44 that extends generally along a second plane, different from the first plane. A first connector portion 46 connects the substrate main body portion 42 with the substrate perimeter portion 44. The substrate perimeter portion 44 extends essentially perpendicular to the substrate main body portion 42, and as shown in FIGS. 3 and 4, preferably extends at an angle of less than about 90° relative to the substrate main body portion 42, more preferably less than about 60°, even more preferably less than about 30°, and preferably more than about 5°. However, it should be understood that substrate perimeter portion 44 may extend in different directions and at different angles than those exemplarily shown in the figures.

The substrate facing portion 50 is exemplarily shown to extend essentially parallel to the substrate main body portion 42, but in a plane that is spaced apart from the first plane. However, it should be understood that the substrate facing portion 50 may extend in different directions and at different angles than those exemplarily shown in the figures. The main body portion 42 of the substrate is the portion of the substrate that is essentially hidden from view when the panel 10 is disposed in the interior of the vehicle.

Making reference to FIG. 2, the substrate main body portion 42 is the portion of the substrate that is abutting the upper mold half 22 of the molding tool 20. The substrate facing portion 50 of the substrate is the portion of the substrate 12 that is facing and exposed to the interior of the vehicle compartment when the panel is disposed in the vehicle. A second connector portion 48 connects the substrate perimeter portion 44 with the substrate facing portion 50. The substrate facing portion 50 extends between and abuts, on opposite sides, both mold halves 22 and 24. Since the substrate facing portion 50 has a facing surface portion 52 that is exposed to the interior of the vehicle compartment during use, the facing surface portion 52 may have a better quality finish than the remainder of the substrate 12. For instance, the facing surface portion 52 may be textured or grained to provide a visually pleasing "A" surface.

As best shown in FIGS. 2–8a, the cover layer 16 is provided with a cover main body portion 30 and a cover perimeter portion 32.

The present invention provides a panel 10 and a molding process which does not allow a noticeable amount of foam, and preferably any foam, to seep out between the cover layer 16 and the substrate 12 onto the interface 14. To inhibit any escape of foaming material 36 or foam 18 between the substrate 12 and the cover layer 16, at least one of the substrate or the cover layer is provided with structure to seal the cover layer 16 to the substrate 12. Exemplary embodiments will be shown and described below.

A first exemplary embodiment is shown in FIGS. 3 and 4. As best shown in FIG. 3, the substrate perimeter portion 44 is provided with a plurality of protrusions, such as teeth 60, extending about the perimeter portion 44. While the illustrated embodiment shows a plurality of teeth, in other embodiments, fewer teeth, such as only one or two teeth, may be employed with similar or acceptable results. When the foaming material 36 is introduced into the cavity 26, the foaming material 36 fills the cavity and urges the perimeter portion 32 of the cover layer 16 against the perimeter portion 44 of the substrate 12.

Since the distal, or free end, of the perimeter portion 32 of the cover layer 16 is positioned in the molding tool 20 above the remainder of the cover layer perimeter portion 32 and the cover main body portion 30, as the foaming material 36 fills the cavity 26, the foaming material 36 will typically fill the lower portions of the cavity first, thus first urging the perimeter portion 32 of the cover layer 16 against the substrate perimeter portion 44 at a location closer to the second connector portion 48 of the substrate 12 than the first connector portion 46. As the cavity 26 fills with foaming material 36, the pressure from the foaming material then urging the remainder of the cover perimeter portion 32 towards the substrate perimeter portion 44 until the distal end of the cover layer perimeter portion 32 is urged towards the substrate perimeter portion. This will typically have the effect of the foaming material 36 causing the portion of the cover perimeter portion 32 relatively adjacent the cover main body portion to contact the perimeter portion 44 of the substrate 12 first with the distal end of the cover perimeter portion 32 contacting the substrate perimeter portion 44 last.

The pressure exerted by the foaming material 36 and the subsequently curing foam 18 is sufficient to cause the perimeter portion 32 of the cover layer 16 to fill in the spaces around the protrusions or teeth 60 of the substrate 12. This causes the teeth 60 to bite into the cover layer 16. This acts to provide a seal between the cover layer 16 and the substrate 12, i.e., a foam shutoff, to inhibit the foaming material 36 or cured foam 18 from escaping between the cover layer and the substrate. This allows for a clean interface 14 between the substrate 12 and the cover layer 16 so that the panel 10 can be used in the interior of a vehicle without having a separate cover or trim piece disposed over the interface of the cover layer 16 and the substrate 12. This reduces complexity and cost of the panel 10 and the process used to make the panel.

Figure 5:
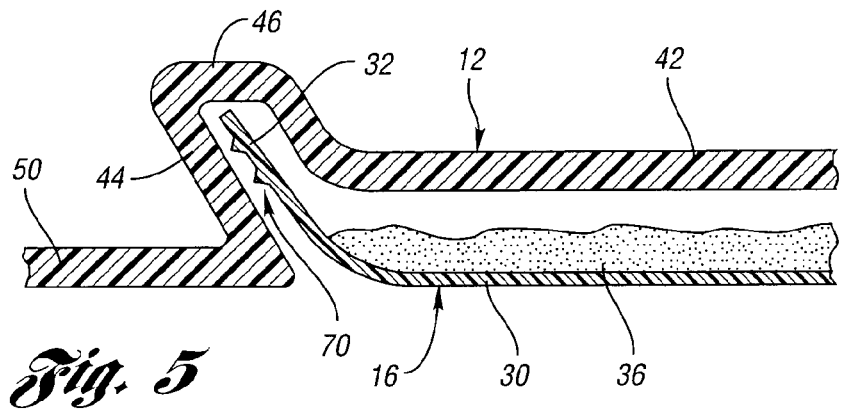
FIG. 5 is a view similar to FIG. 3 illustrating another embodiment of the present invention.
Figure 6:
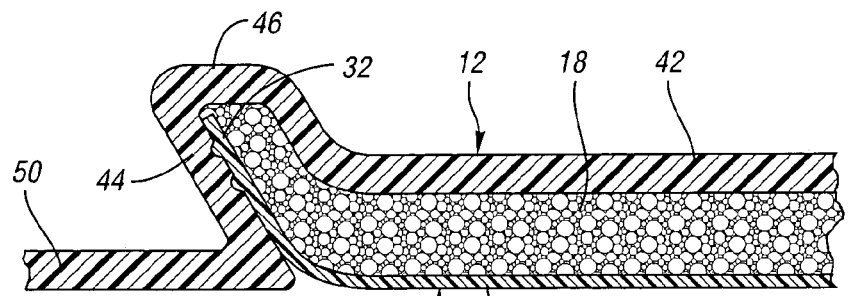
FIG. 6 is a view similar to FIG. 4 illustrating another embodiment of the present invention.

In an alternative embodiment, as shown in FIGS. 5 and 6, the perimeter portion 32 of the cover layer 16 is provided with a plurality of protrusions of teeth 70 extending about the perimeter portion 32 so that the teeth will push against the perimeter portion 44 of the substrate 12 to provide a series of seals formed as a result of the foaming process. As with the previous embodiment, fewer or more protrusions could be employed than that illustrated herein.

In another embodiment, as shown in FIGS. 7a–b and 8a–b, the perimeter portion 32 of the cover layer 16 is provided with a notch 80, extending about the perimeter portion 32, that faces the perimeter portion 44 of substrate 12. The notch 80 is formed at any suitable preformed angle and is preferably shown to be at about a 35° angle. However, in other embodiments, notch 80 may have an angle of about 5–180°, and in yet other embodiments, of about 10–45°. Adjacent the notch 80 is a sealing surface 82 angled with respect to front and rear surfaces 84 and 86, respectively, of the cover layer 16. The sealing surface 82 can be angled at any suitable angle and is preferably shown to be at about a 30° angle relative to the front surface 84 of the cover layer 16, however, can preferably be at about a 1–60° angle, or more preferably about a 5–45° angle.

Figure 7A:
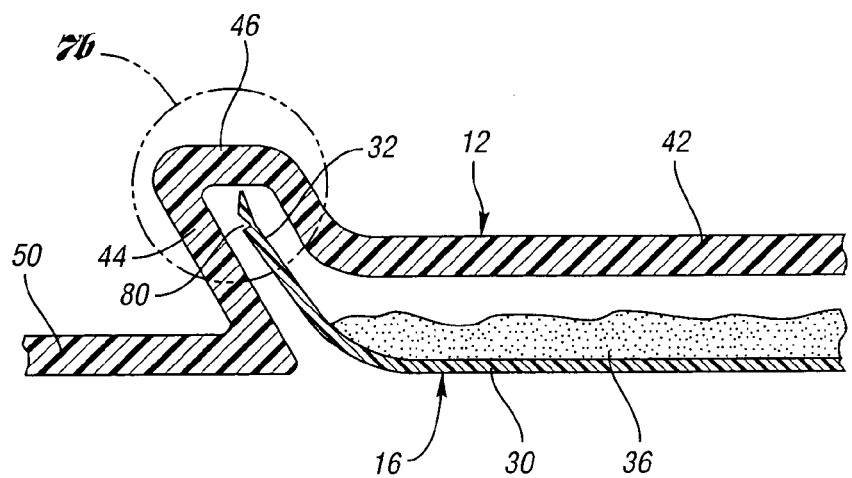
FIG. 7a is a view similar to FIG. 5 illustrating another embodiment of the present invention.
Figure 8A:
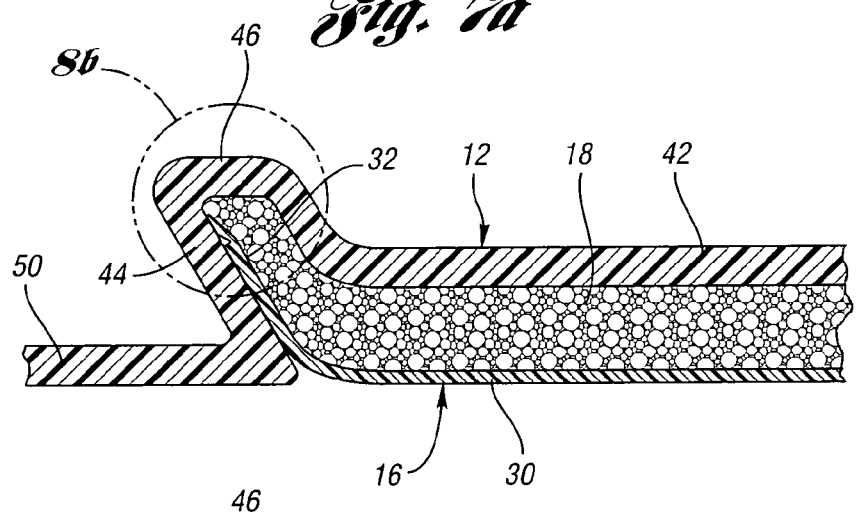
FIG. 8a is a view similar to FIG. 6 illustrating another embodiment of the present invention.
Figure 7B:
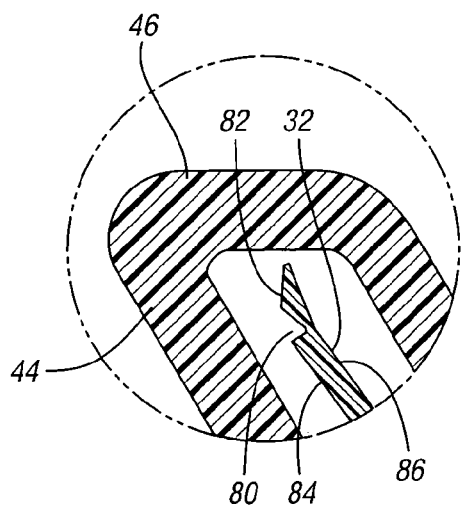
FIG. 7b is an enlarged view of a portion of FIG. 7a taken along line 7b.
Figure 8B:
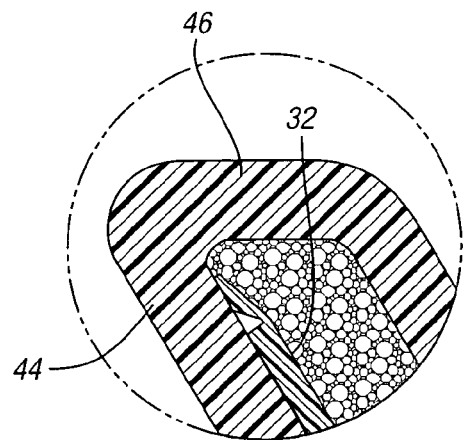
FIG. 8b is an enlarged view of a portion of FIG. 8a taken along line 8b.

During the foaming process, when the foaming material 36 exerts pressure on the distal end of the cover perimeter portion 32, the distal end is urged towards the portion of the cover layer opposite the notch 80. This pressure urges the distal end of the perimeter portion 32 of the cover layer 16 against the substrate to form a seal between the substrate 12 and the cover layer 16. The seal is formed because the notch 80 acts as a hinge to allow the distal end of the cover perimeter portion 32 to bend into the notch 80 and the remainder portion of the cover perimeter portion 32. In doing so, the notch 80 is closed to a second angle, smaller than the performed angle that is schematically represented in FIGS. 7a and 7b. The angle of the notch when in the closed position is preferably 0–40°, and more preferably 1–30°. Also in doing so, at least a substantial portion, and preferably most or all of the sealing surface 82 is allowed to abut against the substrate perimeter portion 44, and lies substantially in the same plane as the inner surface of substrate perimeter portion, when the notch 80 is moved to the closed position. The bent in distal end cooperates with the substrate 12 to inhibit the flow of foaming material 36 or foam 18 past the distal end towards the notch. As shown in the figures, the distal end could have an essentially triangular shape, however it should be understood that the distal end could have other shapes such as rectangular or trapezoidal.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For instance, while teeth have been illustrated to show the protrusions, it is readily contemplated that other shapes, such as, but not necessarily limited to, bumps, bars, ribs, or other trapezoidal shapes, could be used either instead of or with the teeth illustrated in the figures. Moreover, the notch shown in FIGS. 7a–b and 8a–b could be used in connection with at least one of the protrusions shown in FIGS. 3–6. Furthermore, the protrusions, while illustrated as being on one or the other of the cover layer or the substrate, could be on both, either with or without the notch formed into the perimeter portion of the cover layer.

What is claimed is:

1. A panel for use in a vehicle interior, the panel comprising:
    a substrate;
    a cover layer; and
    foam disposed between at least a portion of the substrate and the cover layer;
    the cover layer comprising a perimeter portion having at least one preformed notch at its distal end which allows the distal end of the cover layer to pivot towards the remainder of the cover layer and exert pressure against the substrate to seal the cover layer against the substrate.

2. A panel for use in a vehicle interior, the panel comprising:
    a substrate having a main body portion and a perimeter portion;
    a cover layer having a main body portion and a perimeter portion; and
    foam disposed between the substrate and the cover layer;
    the cover layer comprising a perimeter portion having at least one preformed notch at its distal end which allows the distal end of the cover layer to pivot towards the remainder of the cover layer and exert pressure against the substrate to seal the cover layer against the substrate.

3. The panel of claim 1 wherein none of the foam is present where the perimeter portion of the cover layer exerts pressure against the substrate such that no foam is disposed between the perimeter portion of the cover and the substrate.

4. The panel of claim 1 wherein the perimeter portion comprises an inner surface spaced from an outer surface, the inner and outer surfaces extending substantially parallel to each other, the notch comprising two opposed angled surfaces extending from the outer surface towards the inner surface.

5. The panel of claim 1 wherein the substrate comprises a main body portion, a facing portion substantially parallel to and spaced from the main body portion, and a connector portion extending between the main body portion and the facing portion, a majority of the foam being disposed between the cover layer and the main body portion of the substrate such that the facing portion of the substrate is generally in the same plane as the cover layer and is exposed to the vehicle interior.

6. The panel of claim 1 wherein the substrate has an opening closed by the cover layer.

7. The panel of claim 6 wherein the substrate has a facing surface portion adjacent the opening.

8. The panel of claim 7 wherein the substrate facing surface portion has a grained texture.

9. The panel of claim 5 wherein the facing portion has a grained texture.

10. The panel of claim 1 wherein the notch has an angle of 5°–180°.

11. The panel of claim 1 wherein the notch an angle of 10°–45°.

12. The panel of claim 2 wherein the substrate has an opening closed by the cover layer.

13. The panel of claim 12 wherein the substrate has a facing surface portion adjacent the opening.

14. The panel of claim 13 wherein the substrate facing surface portion has a grained texture.

15. The panel of claim 2 wherein the notch has an angle of 5°–180°.

16. The panel of claim 2 wherein the notch an angle of 10°–45°.

17. The panel of claim 2 wherein none of the foam is present where the perimeter portion of the cover layer exerts pressure against the substrate such that no foam is disposed between the perimeter portion of the cover and the substrate.

18. The panel of claim 2 wherein the perimeter portion comprises an inner surface spaced from an outer surface, the inner and outer surfaces extending substantially parallel to each other, the notch comprising two opposed angled surfaces extending from the outer surface towards the inner surface.

19. The panel of claim 2 wherein the substrate comprises a main body portion, a facing portion substantially parallel to and spaced from the main body portion, and a connector portion extending between the main body portion and the facing portion, a majority of the foam being disposed between the cover layer and the main body portion of the substrate such that the facing portion of the substrate is generally in the same plane as the cover layer and is exposed to the vehicle interior.

20. A panel for use in a vehicle interior, the panel comprising:

a substrate having a main body portion and a perimeter portion;

a cover layer having a main body portion and a perimeter portion; and foam disposed between the substrate and the cover layer, the perimeter portion of the cover layer having at least one preformed notch which is closeable to allow the perimeter portion of the cover to exert pressure against the substrate to seal the cover layer against the substrate.

* * * * *